US011787738B2

(12) United States Patent
Galbani (10) Patent No.: US 11,787,738 B2
(45) Date of Patent: Oct. 17, 2023

(54) PREPARATIONS FOR INDUSTRIAL USE AND THEIR PRODUCTION METHODS

(71) Applicant: : IDEE VULCANICHE S.R.L., Monza (IT)

(72) Inventor: Giuseppina Alba Letizia Galbani, Monza (IT)

(73) Assignee: IDEE VULCANICHE S.R.L., Monza (IT)

( * ) Notice: Subject to any disclaimer, the term of this patent is extended or adjusted under 35 U.S.C. 154(b) by 982 days.

(21) Appl. No.: 16/604,566

(22) PCT Filed: Apr. 10, 2018

(86) PCT No.: PCT/IB2018/052519
§ 371 (c)(1),
(2) Date: Oct. 11, 2019

(87) PCT Pub. No.: WO2018/189685
PCT Pub. Date: Oct. 18, 2018

(65) Prior Publication Data
US 2022/0298074 A1 Sep. 22, 2022

(30) Foreign Application Priority Data
Apr. 11, 2017 (IT) .................. 102017000040115

(51) Int. Cl.
C04B 24/08 (2006.01)
C04B 22/06 (2006.01)
C04B 28/30 (2006.01)
C04B 40/00 (2006.01)
C04B 103/40 (2006.01)

(52) U.S. Cl.
CPC ............ C04B 24/08 (2013.01); C04B 22/062 (2013.01); C04B 28/30 (2013.01); C04B 40/0039 (2013.01); *C04B 2103/40* (2013.01)

(58) Field of Classification Search
CPC . C04B 20/023; C04B 22/0623; C04B 22/066; C04B 24/08; C04B 28/02; C04B 35/03; C04B 35/04; C04B 35/66; C11C 1/00; C11C 3/00
See application file for complete search history.

(56) References Cited

U.S. PATENT DOCUMENTS

| 2,457,582 | A | * | 12/1948 | McCarthy | ................ | C10M 5/00 |
| | | | | | | 508/134 |
| 2,468,098 | A | * | 4/1949 | Morway | .................. | C10M 5/00 |
| | | | | | | 508/415 |
| 6,589,442 | B1 | * | 7/2003 | Wilson | ..................... | C09K 3/22 |
| | | | | | | 252/384 |

FOREIGN PATENT DOCUMENTS

| CN | 103045419 A | * | 4/2013 |
| CN | 105087125 A | * | 11/2015 |
| KR | 10-2013-0051078 A | * | 5/2013 |
| WO | WO-2009008656 A2 | * | 1/2009 |

* cited by examiner

*Primary Examiner* — Anthony J Green
(74) *Attorney, Agent, or Firm* — R. Ruschena Patent Agent, LLC (57) ABSTRACT

Preparation in liquid or creamy or powder form to be used for materials for industrial use such as refractory products, products cementitious, products for buildings, aggregates, binders of various kinds, plastics, natural and synthetic rubber, polymers, bitumen, bituminous conglomerates, active substances that evaporate or dissipate quickly, belonging to insecticides, biocides, pesticides, pesticides, etc., which are made from animal mixtures of oils or fats and at least one base dissolved in water, with percentages by weight of components comprised respectively between 70% and 99.9% of oil or mixture of oils, 0.1% and 10% of base and 0% and 20% of water.

10 Claims, 5 Drawing Sheets

PREPARATIONS FOR INDUSTRIAL USE AND THEIR PRODUCTION METHODS

BACKGROUND OF THE INVENTION

Field of the Invention

The present invention relates to new preparations for industrial use and their production methods. Such preparations can be conveniently used for materials suitable for industrial applications, such as for example construction materials (concretes, bricks, plasters, glues, mortars, precast concrete, joints, etc.), refractory materials (concretes, bricks, prefabricated parts, spray materials, etc.), additives, binders or products of various kinds (paints, plastics, natural and synthetic rubbers, polymers in the liquid state, bitumen, active substances of biocides, insecticides, pesticides, fungicides, plant protection products, etc.).

Various preparations for materials for industrial use are known in the state of the art. In a surely not exhaustive way, the most important additives include:
  reinforcing substances: they improve the mechanical resistance of many plastic products. These are fillers of various kinds used in the form of a glass-like fiber;
  inert charges: they serve as fillers for reducing production costs. In some cases they can improve certain characteristics of the material;
  plasticizers: when added to a rigid resin, they transform the same into an elastic material provided with flexibility and respective softness;
  lubricants: their function is to improve the workability of the polymers, especially with regard to the hot-forming operations (extrusion, molding, etc.);
  fluidifying substances: they have the function of reducing the viscosity of the treated liquids;
  pigments and dyes: they have an aesthetic function;
  stabilizers: they improve the resistance of resins to light radiations, heat, oxidation, etc., which factors exercise degradation actions of the polymer molecule or a real chemical alteration;
  inducers: they increase the reaction speed leading to consolidation and curing of the product;
  inhibitors: they slow down the polymerization reaction.

Each preparation, based on its properties, contributes to the improvement of the physical, chemical and mechanical characteristics of the base material.

In the art however some preparations are not known which are capable at the same time to improve a series of physical-chemical characteristics (i.e. "thermal insulation, specific heat, resistance to ultraviolet rays, mechanical strength, elasticity, resistance to abrasion, viscosity, anchorage to the support, greater persistence of the active substance, reduction of thermal expansions, impermeability to water absorption, smaller capillary increase of chlorides and sulfates, etc.) and can be processed in a stable manner and without requiring an excessive economic expenditure.

SUMMARY OF THE INVENTION

Purpose of the present invention is to provide new preparations, to be included in materials for industrial use, and capable to improve simultaneously and in a consistent way the physical, thermal and duration time characteristics of the treated materials. In particular, the preparations are composed with some oils or mixtures of the same and of have a strong base, in the presence or absence of water.

According to an aspect of the present invention, some preparations are described with the characteristics set out in the annexed independent product claim.

According to a further aspect of the present invention, some production methods of preparations are described, having the characteristics set forth in the annexed independent claim of the method.

Further preferred and/or particularly advantageous embodiments of the invention are described according to the characteristics set forth in the annexed dependent claims.

BRIEF DESCRIPTION OF THE DRAWINGS

The invention will now be described with reference to the accompanying drawings, showing some examples of experimental importance, in which.

DETAILED DESCRIPTION OF THE INVENTION

According to a first aspect of the invention, the new preparations are made of an oil or mixture of oils or a derivative or residue of animal fat and sodium hydroxide with 98-99% purity, in form of flakes or pearls, preferably water-diluted from 10% to 50%.

In the production process of the new preparations other hydroxides may be used as an alternative to sodium hydroxide, i.e.: potassium hydroxide, magnesium hydroxide and/or other basic hydroxides, individually, or in an aqueous dilution. In the following, such hydroxides will be generally briefly called "base". The percentages in weight of the components are respectively comprised from 70% to 99.9% oil, 0% to 10% base and 0% to 20% water.

Preferably, such oils can be the following:
a) mineral oils (base mineral oils of first production, derivatives and processing residues)
b) vegetable oils (base vegetable oils of first production, derivatives, and processing residues)
c) animal fats (animal fats of first production, derivatives, and processing residues)
d) exhausted mineral and vegetable oils and/or exhausted oils from animal fats.

All such oils can be used individually or in any mutual combination, in this case mixed according to any percentage.

Advantageously, the base can be exclusively made of an aqueous solution of flakes (or pearls) of sodium hydroxide with 98-99% purity, with a percentage of 30%, diluted in 70% water.

Such percentage allows to obtain the best effect. In any case, good results are also obtained either by using sodium hydroxide with any percentage in weight (from 10 to 50%) in aqueous solution, or by using such sodium hydroxide solution mixed with other types of hydroxide solutions, or other hydroxides (magnesium hydroxide, potassium hydroxide and/or others) may be used individually with any percentage from 10 to 70%, always in aqueous solution, or all of these hydroxides can be used simultaneously, by not exceeding the expected total percentage of basic process.

According to a further aspect of the invention, regarding the aforementioned oils, at a) b) and c) the production process of the new preparation consists in heating the aforementioned oils or mixtures of oils or its derivatives or processing residues of animal fats at a temperature from 70° C. to 140° C., by maintaining them at such temperature for a period of at least 72 h. The heating advantageously carried out with mechanical stirring has the function of eliminating any residual water, and cause its oxidation. It is therefore possible to proceed directly or after a waiting time for cooling to room temperature, by mixing the oils or mixtures of oils of derivatives, or processing residues of animal fats with the base, in order to obtain their polymerization. The components are mixed by mechanical stirring for more than 1 minute (preferably for a time between 1 h and 4 h) and at a temperature between 50° C. and 200° C.

On the contrary, concerning the oils mentioned in d) (exhausted mineral oils, vegetable oils derived from animal fats), and/or cashew nut oils and/or their derivatives or processing residues, they do not need to be submitted, before processing to thermal cycles for oxidizing them, as they are already oxidized, but it is only sufficient to submit them, still with mechanical stirring, to a treatment for 24 h at a temperature from 70° C. to 120° C., in order to eliminate any residual water or other liquid substances which may affect the positive result of the process.

It is therefore possible to proceed, directly or after a time necessary for cooling, with the mixing of the exhausted oils and/or of the cashew nut oils, with a base (30% sodium hydroxide in aqueous solution) or with a mixture of other bases or with a different base type, suitably diluted in water in order to obtain the polymerization. The components are mixed with mechanical stirring for more than 1 minute (preferably between 1 h and 4 h), and at a temperature between 50° C. and 200° C.

A first practical but non limitative embodiment, consists in mixing to one kilogram of mineral oil of first production and/or of a derivative or a previously oxidized processing residue (treated with a temperature cycle from 70° to 140° C. for 72 h), and/or with one kilogram of exhausted mineral oil (treated with a temperature cycle from 70° C. to 120° C. for 24 h) with:
A) 2 to 50 g of 98/99% purity sodium hydroxide in the form of flakes or pearls, preferably 6 g, diluted in 7-150 g water, preferably 14 g;
B) 2 to 50 g of 98/99% sodium hydroxide in flakes or pearls, preferably 9 g, diluted in 7-150 g water, preferably 21 g;
C) 2 to 50 g of sodium hydroxide, preferably 12 g, diluted in 7-150 g water, preferably 28 g.

The polymerization (or reaction) takes place, for all three types, at a temperature between 50 and 200° C., preferably between 90° C. and 110° C., and comprises a mechanical stirring, with a duration time from 2 h to 50 h, preferably of 4 h.

A second practical embodiment consists in mixing to one kilogram of sunflower vegetable oil and/or other types of vegetable oils of first production and/or derivative or processing residue, previously oxidized (treated with a temperature cycle from 70° C. to 140° C. for 72 h), and/or cashew nut oil (cashew nutshell liquid CNSL), with:
A) 2 to 50 g of 98/99% sodium hydroxide in flakes or pearls, preferably 6 g, diluted in 7-150 g of water, preferably 14 g,
B) 2 to 50 g of 98/99% sodium hydroxide in flakes or pearls, preferably 9 g, diluted in 7-150 g of water, preferably 21 g,
C) 2 to 50 g of sodium hydroxide, preferably 12 g, diluted in 7-150 g of water, preferably 28 g.

The process takes place at a temperature from 50 to 200° C., preferably from 90° C. to 110° C., and comprises a mechanical stirring with a duration time from 2 to 50 h, preferably 4 h. It is noted that the cashew nut oil (cashew nut shell liquid CNSL), unlike all other mineral, vegetable or animal fat oils, in the production phase of the new preparation does not need to be preheated, neither for being oxidized, nor for being purified.

A third practical embodiment consists in mixing to one kilogram of residue vegetable oil of rape seed and/or of derivative, and/or processing residue of animal fats or a mixture thereof, previously oxidized (treated with a temperature cycle from 70° C. to 140° C. for 72 h) with:
A) 2 to 50 g of 98/99% sodium hydroxide in flakes or pearls, preferably 6 g, diluted in 7-150 g of water, preferably 14 g;
B) 2 to 50 g of 98/99% sodium hydroxide in flakes or pearls, preferably 9 g, diluted in 7-150 g of water, preferably 21 g;
C) 2 to 50 g of sodium hydroxide, preferably 12 g, diluted in 7-150 g of water, preferably 28 g.

The process takes place at a temperature from 50 to 200° C., preferably from 90° C. to 110° C., and comprises a mechanical stirring, with a duration time from 2 to 50 h, preferably 4 h.

A fourth practical embodiment consists in mixing to one kilogram of vegetable ester oil and/or a derivative thereof and/or its processing residue, previously oxidized (treated with a temperature cycle from 70° C. to 140° C. for 72 h), and/or of exhausted ester vegetable oil treated with a temperature cycle from 70° C. to 120° C. for 24 h) with:
A) 2 to 50 g of 98/99% sodium hydroxide in flakes or pearls, preferably 6 g, diluted in 7-150 g of water, preferably 14 g;
B) 2 to 50 g of 98/99% sodium hydroxide in flakes or pearls, preferably 9 g, diluted in 7-150 g of water, preferably 21 g;

C) 2 to 50 g of sodium hydroxide, preferably 12 g, diluted in 7-150 g of water, preferably 28 g.

The process takes place at a temperature from 50 to 200° C., preferably from 90° C. to 110° C., and comprises a mechanical stirring, with a duration time from 2 to 50 h, preferably 4 h.

The new preparations, according to the invention, can be of mineral, vegetable or animal origin and can be obtained by using any amount of base process (sodium hydroxide, in aqueous solution), which was introduced in the process individually or mixed with other types of process bases, such as potassium hydroxide, magnesium hydroxide and/or others in aqueous solution, or by individually using any of such hydroxides.

These new preparations A, B, C can be marketed to be directly used with the above listed products, with the aim of improving the thermal physical characteristics, or can be placed introduced into a new production cycle which is identical to the previous ones, in order to eliminate the use of the base (sodium hydroxides, etc.), and to be capable to produce a new preparation D, which will have the same characteristics as preparations A, B, C. Of course, when using the base (sodium hydroxide and/or other types of hydroxides in solution), the percentage of the same does not exceed almost every time 4%, whereas when using the new preparations A, B, C in this alternative process, the same are introduced in higher percentages (from 10% to 30% and/or even more).

A first practical embodiment of preparation D, though not limitative, consists in mixing to one kilogram of mineral oil of first production and/or derivative or processing residue, previously oxidized (treated with a temperature cycle from 70° C. to 140° C. for 72 h), and/or to one kilogram of exhausted mineral oil, treated with a temperature cycle from 70° C. to 120° C. for 24 h.

50 g to 500 g (preferably 300 g) of preparation A
50 g to 500 g (preferably 200 g) of preparation B
50 g to 500 g (preferably 100 g) of preparation C The process takes place, for all three types, at a temperature from 50 to 200° C., preferably comprised between 90° C. and 110° C., and includes a mechanical stirring with a duration time from 2 h to 50 h, preferably of 4 h.

A second example of a practical embodiment of the preparation D consists in mixing to one kilogram of sunflower vegetable oil, and/or of other types of vegetable plants of first production and/or derivative or processing residue, previously oxidized, (treated with a temperature cycle from 70° C. to 140° C. for 72 h), and/or a cashew nut oil (cashew nut shell liquid CNSL) with 50 g to 500 g (preferably 300 g) of preparation A
50 g to 500 g (preferably 200 g) of preparation B
50 g to 500 g (preferably 100 g) of preparation C The process takes place at a temperature comprised between 50 and 200° C., preferably between 90° C. and 110° C., and comprises a mechanical stirring, with a duration time from 2 to 50 h, preferably of 4 h. It is noted that the oil of cashew nut (cashew nut shell liquid CNSL), as opposed to all other mineral, vegetable or animal fat oils, in the construction phase of the preparation, neither needs to be preheated to be oxidized, nor to be purified.

A third practical example of embodiment of preparation D consists in mixing to one kilogram of residual vegetable oil rape seed and/or derivative, and/or processing residue of animal fat, or to a mixture of the same, previously oxidized (treated with a temperature cycle from 70° C. to 140° C. for 72 h), with:

50 g to 500 g (preferably 300 g) of preparation A
50 g to 500 g (preferably 200 g) of preparation B
50 g to 500 g (preferably 100 g) of preparation C The process takes place at a temperature from 50 to 200° C., preferably from 90° C. to 110° C., and comprises a mechanical stirring, with a duration time from 2 and 50 h, preferably of 4 h.

A fourth practical example of embodiment consists in mixing to one kilogram of vegetable ester oil and/or a derivative thereof and/or a previously oxidized processing residue (treated with a temperature cycle from 70° C. to 140° C. for 72 h), and/or to 1 kilogram of exhausted vegetable ester oil (treated with a temperature cycle from 70° C. to 120° C. for 24 h), with:

50 g to 500 g (preferably 300 g) of preparation A
50 g to 500 g (preferably 200 g) of preparation B
50 g to 500 g (preferably 100 g) of preparation C The process takes place at a temperature comprised between 50 and 200° C., preferably between 90° C. and 110° C., and comprises a mechanical stirring, with a duration time from 2 and 50 h, preferably of 4 h.

Naturally, these four examples represent only a few solutions for obtaining the preparation D.

The preparations A, B, C, D, although coming from different matrices (mineral, vegetable, animal) and although being provided with different viscosities, provide the treated products with the same physical and thermal characteristics and the same peculiarities. It is therefore convenient, in general with regard to the physical and thermal characteristics and consequential advantages, not to mention the preparations A, B, C, D, individually, but to identify them with a unique name: new preparation.

The use of the new preparation can be done either directly, that is with the use in a liquid or creamy state as exiting from the production, or indirectly and in such case being present under different shapes, listed below.

As a direct use of the new preparation:
the new preparation is marketed without undergoing any processing and can be used at room temperature or preferably at a temperature of about 50° C. in the following products:

1) refractory products (refractory products based on magnesite and/or, resinated dolomite, cooked magnesite and/or dolomite etc.). The recommended percentage varies either from 1.2% to 2% with the binders used for their construction, or from 0.03% to 0.05% on the total weight of the inert substances used;
2) bituminous conglomerates and bituminous sheaths. The recommended percentage is of about 1%;
3) polymers, paints, rubbers, plastic materials and other products which do not accept the presence of water. The recommended percentage is of about 1%;
4) insecticides, biocides, anti-cryptogamic plant protection products which do not accept the presence of water. For optimum results it is advisable to use the new preparation with the same amount of active substance being present in these products.

With reference to an indirect use of the new preparation, we speak of an indirect use of the new preparation, in the case in which it is not used directly, but before being marketed, it undergoes further processing, and the same gives rise to the following new preparations:

aqueous L/A emulsion obtained by mixing 1 part of the new preparation, 3 or more parts of water and of a Caflon or Sabotal type emulsifier. Such new preparation L/A is used in quantities ranging from 0.01% to 2% in the following products: insecticides, biocides, pesticides, anti-cryptogamic plant protection products, water-based paints, (lime-based, silicate-based siloxane, etc.), various additives used as fluidifying and super fluidifying substances (lignin sulfonates, naphthalene sulphonates, siloxanes, acrylic products, etc.), which are used to improve the quality of conglomerates and cement products, thus allowing to sensibly reduce the mixing water, refractory products formed and not formed which however do not fear the presence of water, etc.

powdered product R which is prepared by mixing the new preparation (3%), preheated at 100/120° C., with different types of refractory powders, magnesite based with grains from 50 μm to 300 μm, which are also preheated, until impregnated and sliding powders of the new preparation are obtained. After such absorption process, the final product is sifted and packed into sacks and is ready for marketing. Such powdered product, called new preparation R, is completely water-free and can be used, in a quantity from 1% to 1.5%, in basic refractory products, not compatible with the presence of water, so allowing them to acquire the same characteristics of the products, when the new Original preparation is used with them.

mortar which is prepared by mixing the new preparation (3%), with different types of refractory powders based on alumina, zirconium oxide, bauxite, andalusite, silica, various fireclays, etc., with grain size from 50 μm to 300 μm (97%), which when mixed with water (from 20 to 40%) produce a paste type sliding mortar, which, once amalgamated, is poured in suitable containers which are placed in an oven, where a complete drying of the powders takes place through a predefined drying cycle. The dried powders, will then be sieved and packed in sacks, ready for marketing. The same can be inserted and suitably mixed (1%-1.5%) in the mentioned refractories, by transferring to them the same characteristics and peculiarities which are normally obtained when using the original product of the new preparation.

wax is prepared by mixing the new preparation (3% or in greater quantities), which is preheated up to 100/120° C., with any type of organic compound based on lipids which is preheated in the liquid state (the quantity of wax may be 97% or a smaller amount). Once having reached a good homogeneity of the product (wax+p), the whole is cooled up to room temperature. The product solidifies due to the wax effect and after its complete solidification which usually takes place at room temperature, it is subjected to a shredding process which allows the new powdered preparation C to be obtained. This wax is sifted and packed in sacks and is ready for marketing. The same, in the form of a micronized powder, is used in percentages from 1% to 1.5% on the products to be treated and gives the same identical thermal-physical characteristics which are obtained when using the new original preparation.

Some main characteristics of the products treated with any type of new preparations for direct or indirect use:
greater mechanical resistance
better thermal insulation
greater thermal capacity
lower thermal diffusion
greater impermeability
greater UV resistance
greater resistance to abrasion
lower and slower evaporation of the active substance being a part of the treated products (insecticides, biocides, anticryptogamic substances) with consequent greater efficiency and persistence in time of the same
possibility of reducing the quantity of binders used to make the products (10%-15%).
the solidification point of the treated liquid products, at a temperature below zero, is lowered by about 4/5° C. (see FRAAS Test of the University of Ancona).
greater adhesion capacity of the treated paints
slower evaporation resulting in lower loss, over time, of plasticizers and/or elasticizers, introduced in paints or other products processed, resulting in greater durability of the same
greater duration of the color intensity over time in the treated products
in the construction field, a substantial increase in the duration of cast concrete, prefabricated concrete, plasters, mortars, and all cement products, is obtained. Such greater duration is due to the transformation of the structure of the treated products in a microstructure due to the use of the new preparation. The characteristics which can be found in the laboratory are a lower capillary rise of water containing chlorides and sulphates of the treated products, compared to those not treated.
in the field of bituminous conglomerates, a greater thermal capacity of the treated conglomerate is obtained, with respect to the same untreated conglomerate, whereby the treated conglomerate cools much more slowly. This important characteristic, together with another peculiarity, is namely that a treated bitumen, at the same temperature, has a lower viscosity than an untreated bitumen, and allows to spread the conglomerate at temperatures lower than about 20° C. with respect to the untreated one. A greater resistance to oxidation, whereby the treated bituminous conglomerate has a longer life, compared to the same untreated conglomerate. To demonstrate such peculiarity, fatigue cycle tests have been carried out at the University of Ancona, the number of which is about 50% greater than the number of cycles in the untreated conglomerate.

These characteristics have been verified and demonstrated in an impressive experimental campaign which was conducted with the help of Universities and research centers with proven experience, in order to objectify the peculiarities of the preparations referred to in the present invention.

Figure 1:
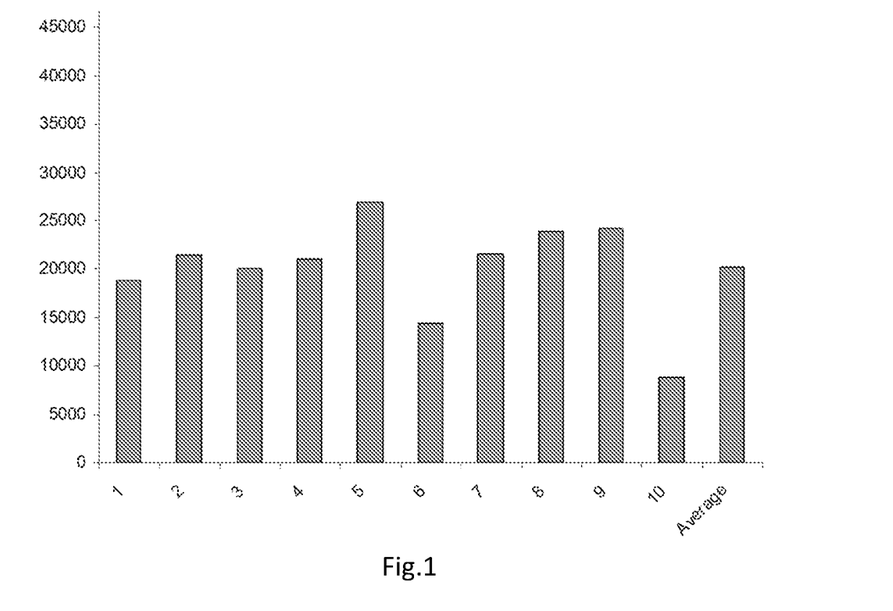
FIG. 1 is a graph showing the numbers of breaking cycles for a plurality of samples of traditional bituminous conglomerate without additives, with the preparations according to the present invention.
Figure 2:
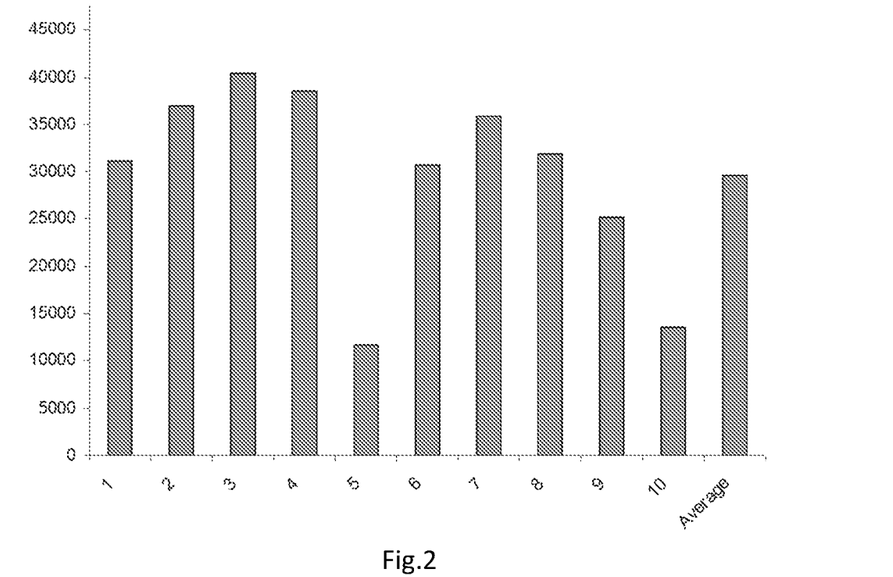
FIG. 2 is the same graph of FIG. 1, in which the traditional bituminous conglomerate is treated with a preparation according to the present invention.

By way of example and with reference to the attached graphs, the experimental evidences relating to the addition of the preparation to bituminous conglomerates, made by the Marche University of Ancona, are reported. In the graphs shown in FIGS. 1 and 2, breaking cycles numbers are given for a plurality of samples of traditional bituminous conglomerate which was not added to the preparations according to the present invention (FIG. 1) and treated with a preparation as for this invention (FIG. 2). Both graphs were made using 10 samples. The last bar shows the average value of the number of breaking cycles for the samples analyzed. From the analysis of the results it can be deduced that, for the traditional bituminous conglomerate considered, the preparation involves an average of breaking cycles equal to 47%.

Figure 3:
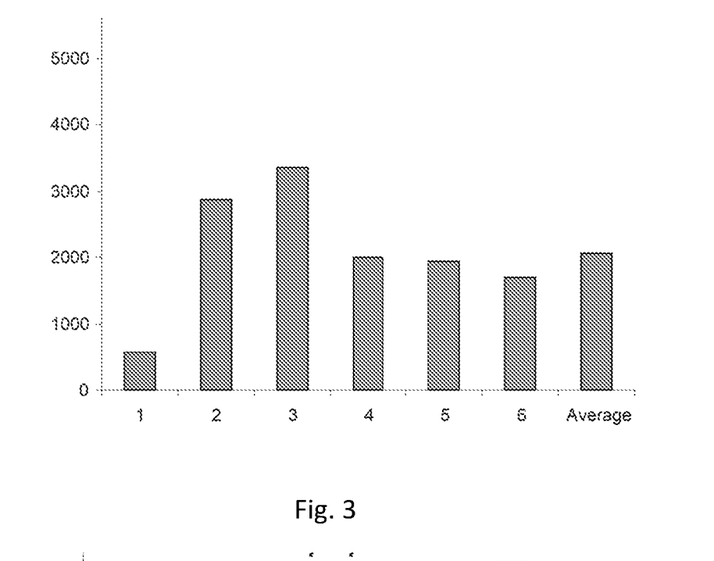
FIG. 3 is a graph showing the numbers of breaking cycles for a plurality of samples of draining bituminous conglomerate without additives, with the preparations of the present invention.
Figure 4:
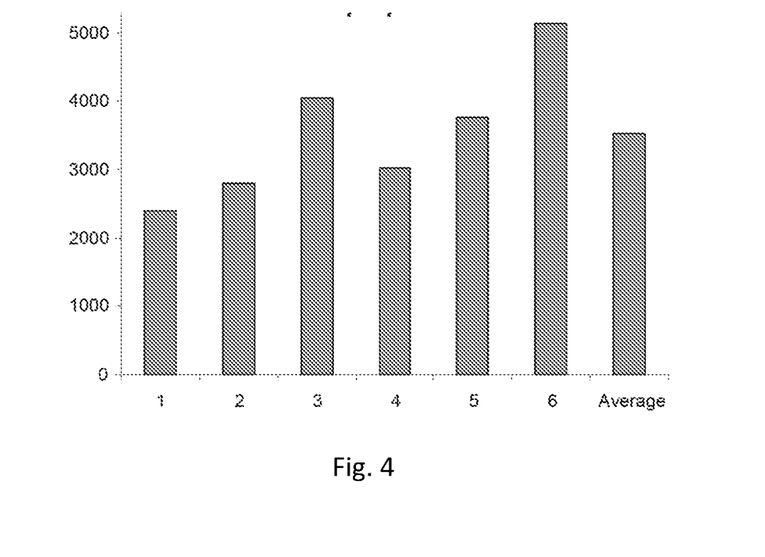
FIG. 4 is the same graph of FIG. 3, in which the draining bituminous conglomerate is treated with a preparation according to the present invention.
Figure 5:
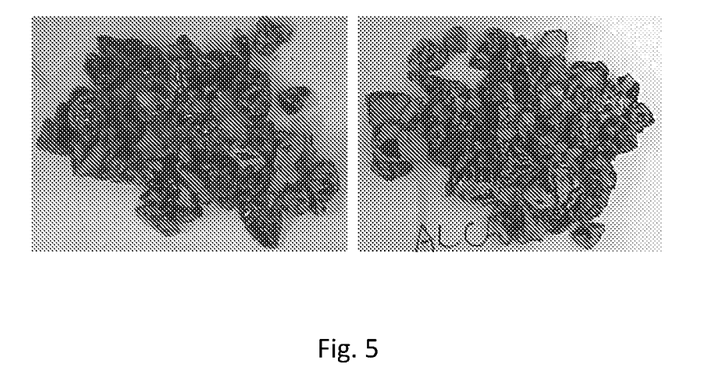
FIG. 5 shows a sample made of calcareous granules and untreated bitumen.
Figure 6:
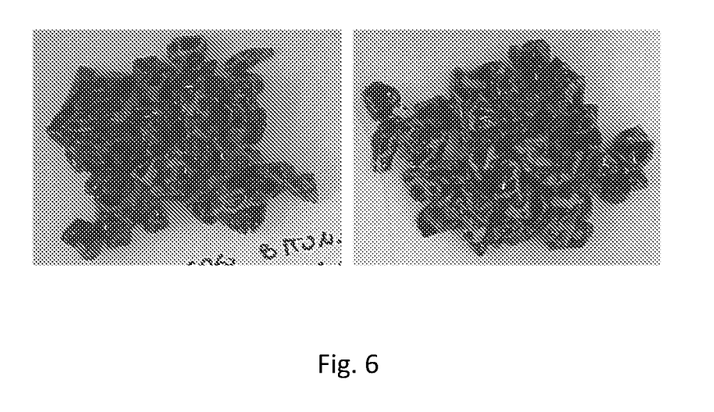
FIG. 6 shows a sample made of calcareous granules and treated bitumen.
Figure 7:
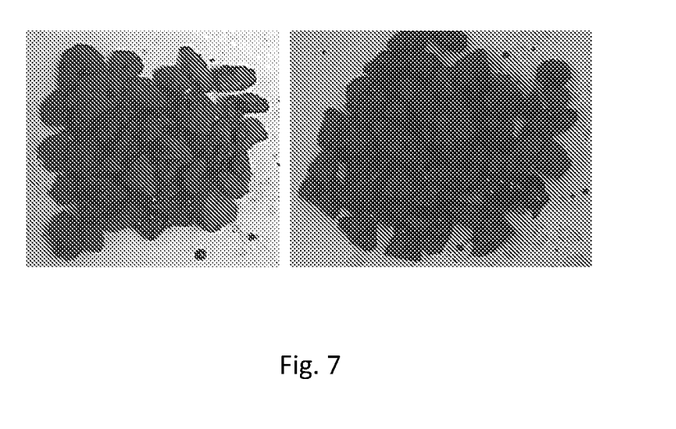
FIG. 7 shows a sample made of basaltic granules and untreated bitumen.
Figure 8:
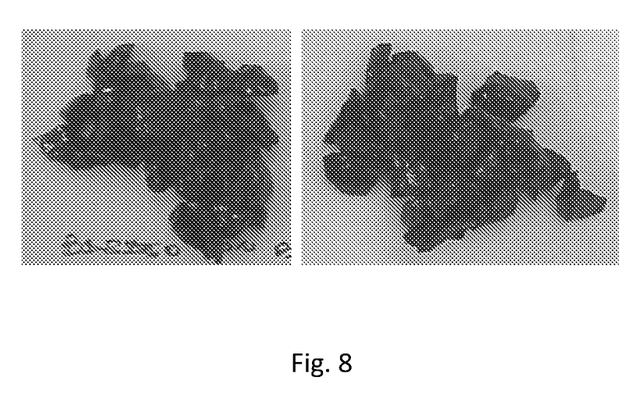
FIG. 8 shows a sample made of basaltic granules and treated bitumen.
Figure 9:
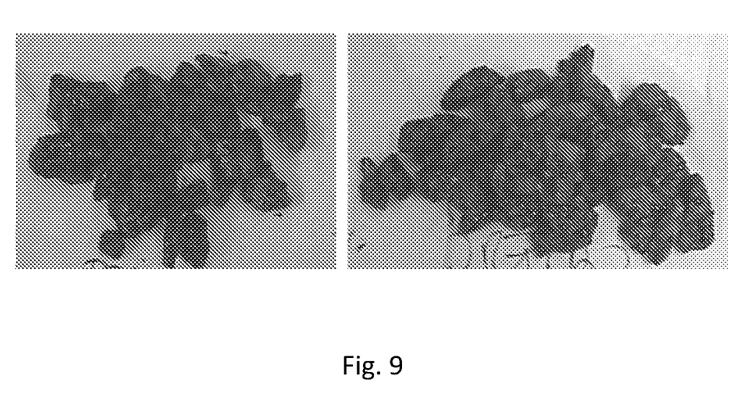
FIG. 9 shows a sample made of porphyric granules and untreated bitumen.
Figure 10:
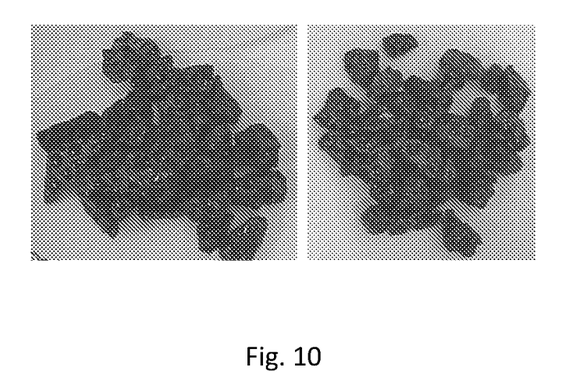
FIG. 10 shows a sample made of porphyric granules and treated bitumen.

In the graphs referred to in FIGS. 3 and 4, numbers of breaking cycles for a plurality of samples of draining bituminous conglomerate without additives are reported, together with the preparations of the present invention (FIG. 3) and treated with a preparation referred to in the present invention (FIG. 4). Both graphs were made using 6 samples. The last bar shows the value of the number of breaking cycles for the samples analyzed.

From the analysis of the results it can be seen that, in the case of draining bituminous conglomerate, the use of the preparation leads to an increase of the average breaking cycles of 70%.

A further test carried out is the so-called "Ancona stripping test". The purpose of this test is to evaluate the adhesion parameter between an inert and bitumen. Briefly, the test procedure provides that a sample of granulated bitumen, packaged in a standardized manner, is placed in a beaker with distilled water, in turn immersed for a predetermined time in a boiling water bath. The evaluation of the percentage of inert surface which remains covered with bitumen at the end of the test, allows to make a judgment on the adhesive capacities of the bitumen-aggregate system.

From the combination of two types of binder (70/100 treated and non-treated) and three mineralogical states of aggregates (calcareous, basalt and porphyry) six different types of samples were packaged. From the analysis of the images (FIG. 5-10) obtained on the types of samples, it is clear that the stripping of the inert portions of bitumen treated at 1.2% was lower compared to that on the same aggregates of the untreated bitumen. This indicates that the treated bitumen guarantees better inert-bitumen adhesion.

Figure 11:
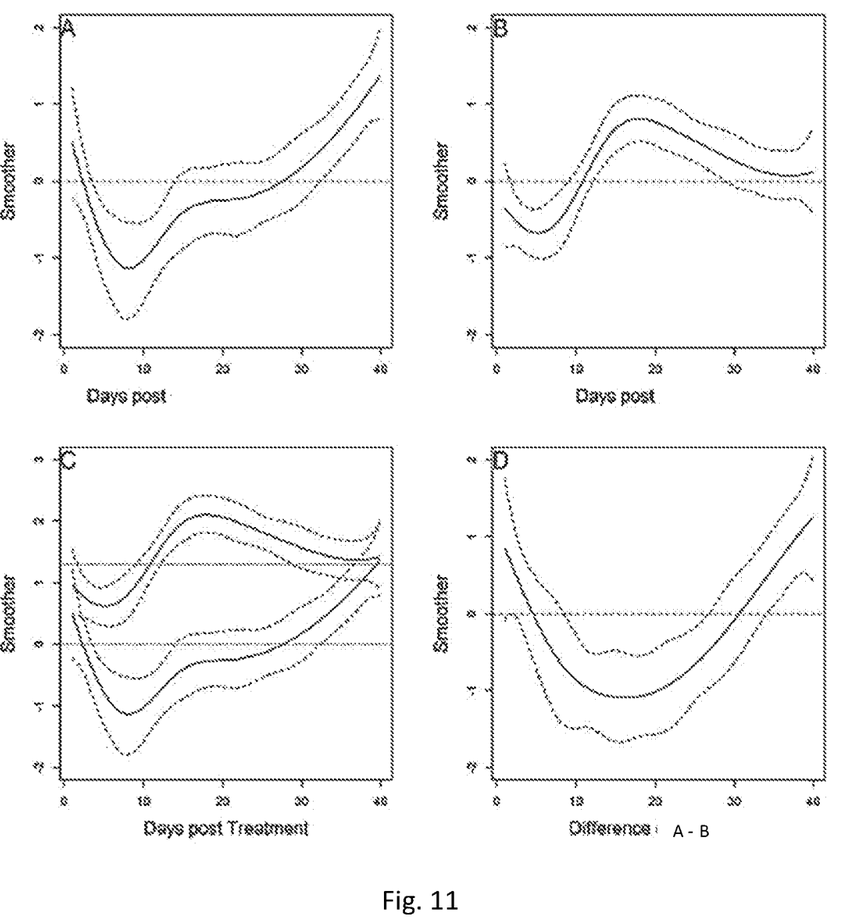
FIG. 11 shows the relationship between time and average value of post-treatment catches in places treated with insecticides.

Another type of test was conducted by the Università della Sapienza of Rome, in order to evaluate the insecticidal properties of the preparations in question. In particular, the aim of this test campaign was to verify the adult insecticide properties and improve its anti-mosquito activities with the addition of the preparation which should guarantee both a greater availability of the insecticide at the time of contact with the surface by insects and an increased acceptability of the insecticides in time. FIG. 11 shows the relationship between time and average catch values after treatment at the treated sites. The graph shows the trend of the catches compared to the average recorded in the respective treated sites: A) preparation and insecticide, B) insecticide, C) overlapping of the trends in A and B, D) difference between average of catches of graphs A) and B). In A), B), C) the horizontal dash lines identify the average of the statistical distribution of the catches, in A) and B) centered in 0, in C) with an estimated value. Regarding the site with the preparation, the average of catches is less than the that of the site with insecticide. Only towards the end of the monitoring also the catches in the site with the preparation meet the average of the site with insecticide.

The result highlights, therefore, a substantial equity between the two treatments (absence of the preparation, presence of the preparation) in the first ten days where in both sites a reduction compared to the average is recorded.

Subsequently, for about two weeks, the relationship time-catches, or the increase over time of the presence of mosquitoes, is slower for the treatment with preparation. In conclusion, a significant improvement in site disinfestation can be achieved.

Further tests have been carried out with the University of Salento on the chemical-physical behavior of refractory materials. In particular, samples of refractory alumina were compared with and without the preparation of the present invention.

The microstructural analysis highlighted the following characteristics:

TABLE 1

| Property | Sample without preparation | Sample with preparation |
| --- | --- | --- |
| Total volume (cc/g): | 0.075 ± 0.005 | 0.078 ± 0.005 |
| Specified area (m$^2$/g) | 0:21 ± 0.01 | 0:23 ± 0.01 |
| Average pore radius (µm) | 0.83 ± 0.02 | 0:53 ± 0.02 |
| Total porosity (%) | 20.0 ± 0.6 | 21.0 ± 0.6 |
| Density (g/cm3) | 2.70 ± 0.05 | 2.69 ± 0.05 |
| Apparent density (g/cm3) | 3:35 ± 0.05 | 3:40 ± 0.05 |

From a comparison of the results it should be noted, in comparison with a substantial identity of the total porosity, a clear reduction of the pore size with the addition of the preparation which is reflected in a slight increase of the surface area.

Figure 12:
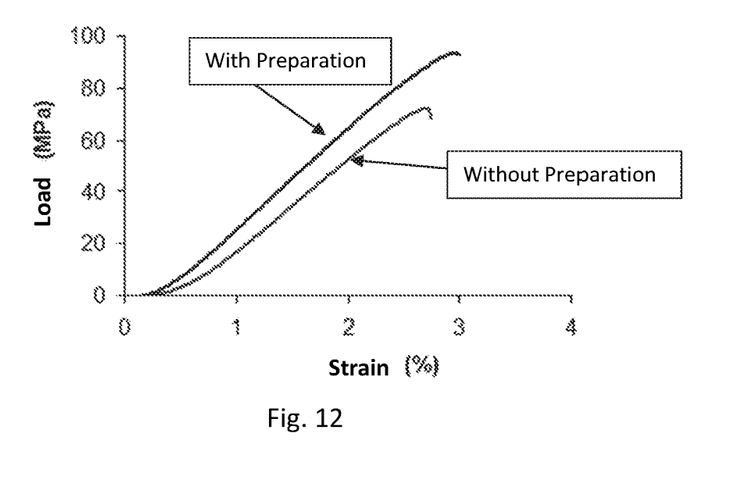
FIG. 12 shows a compression test of refractories with and without preparation, according to the present invention.

In addition, the analysis of the mechanical characteristics, carried out by comparing the load-deformation diagrams in compression of the samples with and without preparation, allows to observe how refractories in which there is the presence of the preparation, have more performing mechanical characteristics (see FIG. 12), presumably due to the presence of the preparation which during the mixing step of the raw materials favors a better compaction of the refractory, reducing the size of the pores. All these cases are coherent with the porosity measurements, in which a significant reduction of the pore size in the samples in which there is the preparation is observed.

In addition to the embodiment of the invention, as described above, it is to be understood that numerous further variants exist. It must also be understood that said embodiments are only exemplary and do neither limit the object of the invention, nor its applications, nor its possible configurations. On the contrary, although the above description makes it possible for the skilled person to implement the present invention at least according to an exemplary embodiment thereof, it must be understood that many variations of the described components are conceivable, without thereby escaping from the object of the invention. which is defined in the attached claims, interpreted literally and/or according to their legal equivalents.

The invention claimed is:

1. A preparation for materials for industrial use in a liquid or creamy form comprising:
   an oil;
   at least a base dissolved in water;
   wherein:
     said oil is selected from the group consisting of mineral oil of first production, exhaust mineral oil, vegetable oil,
     exhaust vegetable oil, a residue produced during vegetable oil processing and a residue produced during mineral oil processing;
   and wherein
     the percentage by weight of said oil is comprised between 70% and 99.9%;
     the percentage by weight of said base is between 0.1% and 10% of the composition;
     and wherein said base is sodium hydroxide between 98% and 99% purity,
     and
     said base is dissolved in water in a percentage by weight ranging between 10% and 50%.

2. The preparation according to claim 1, comprising:
one kilogram of oil made of:
  sunflower vegetable oil and
  other types of vegetable oils of first production and
  a residue produced during vegetal oil processing and
  cashew nut oil and
  from 2 to 50 g of sodium hydroxide, dissolved in 7-150 g of water.

3. The preparation according to claim 1, comprising:
  one kilogram of rapeseed oil residue and
  from 2 to 50 g of sodium hydroxide, dissolved in 7-150 g of water.

4. The preparation according to claim 1, comprising:
one kilogram of vegetable ester oil and
a residue produced during vegetable ester oil processing and
exhaust vegetable ester oil and
from 2 to 50 g of sodium hydroxide, dissolved in 7-150 g of water.

5. The preparation according to claim 1, comprising:
one kilogram of mineral oil of first production;
residue produced during mineral oil processing;
exhaust mineral oil and
from 2 to 50 g of sodium hydroxide, dissolved in 7-150 g of water.

6. The preparation according to claim 1, comprising:
one kilogram of sunflower vegetable oil;
other types of vegetable oils;
a residue produced during vegetal oil processing;
cashew nut oil and
from 2 to 50 g of sodium hydroxide, dissolved in 7-150 g of water.

7. The preparation according to claim 1, comprising:
one kilogram of rapeseed oil residue;
residue of animal fat processing;
a mixture thereof and
from 2 to 50 g of sodium hydroxide, dissolved in 7-150 g of water.

8. The preparation according to claim 1, comprising:
one kilogram of vegetable ester oil;
residue produced during vegetable ester oil processing;
exhaust vegetable ester oil and
from 2 to 50 g of sodium hydroxide, dissolved in 7-150 g of water.

9. The preparation according to claim 1, comprising:
one kilogram of oil made of:
  mineral oil of first production and
  a residue produced during mineral oil processing and
  exhaust mineral oil;
from 2 to 50 g of sodium hydroxide, dissolved in 7-150 g of water.

10. The preparation according to claim 1, whenever is:
taken in a quantity proportion of as one part, and added three parts of water and an emulsifier, said preparation forms a water-based emulsion;
taken in a quantity proportion of 3% by weight and added a quantity of refractory powders based on magnesite with particle size from 50 μm to 300 μm, said preparation forms a product in powdered form;
taken in a quantity proportion of 3% by weight and added refractory powders with a particle size from 50 μm to 300 μm and water, said preparation forms a mortar compound;
taken in a quantity proportion of 3% by weight and added an organic compound fat-based, said preparation forms a wax product.

* * * * *